May 10, 1949.  J. W. NAPIER  2,470,046
ELECTRIC INCUBATOR
Filed July 11, 1946  3 Sheets-Sheet 1
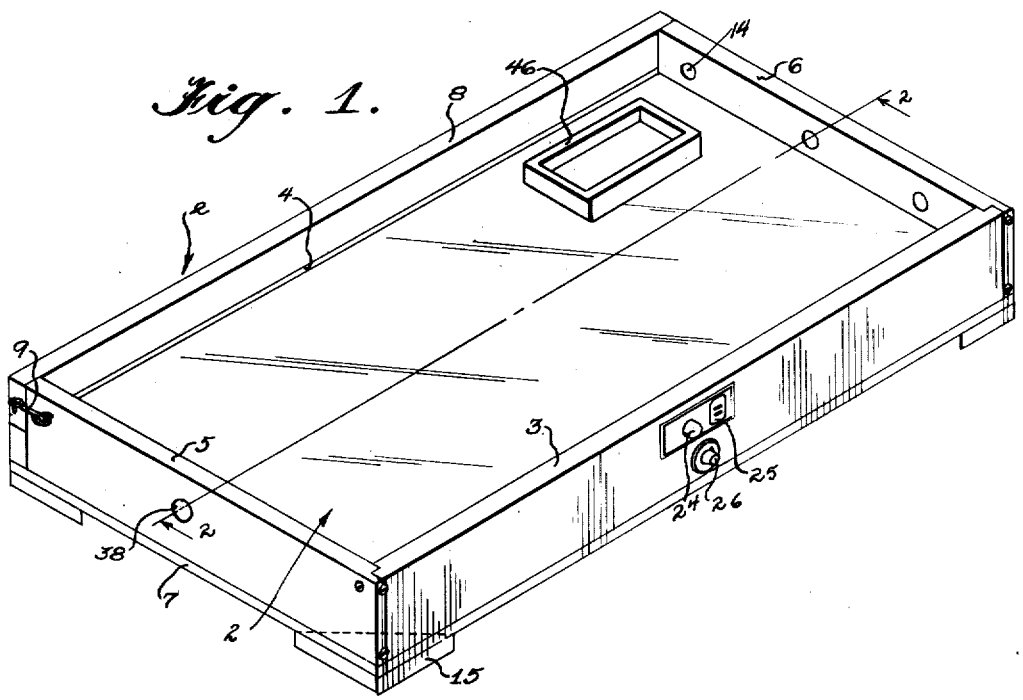
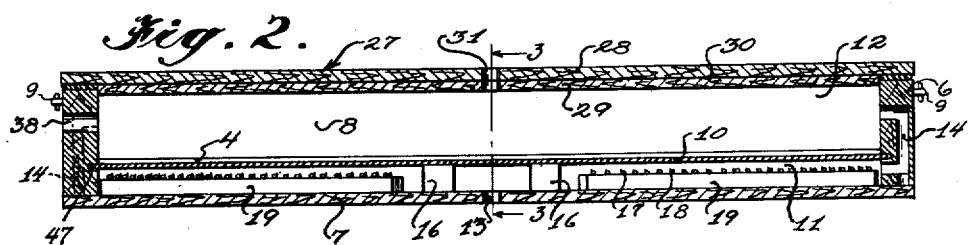
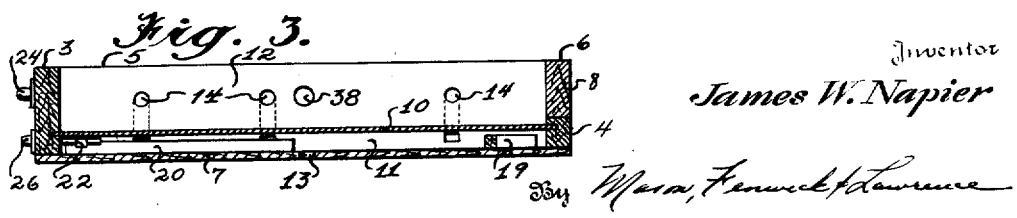
Inventor
James W. Napier May 10, 1949.　　　　J. W. NAPIER　　　　2,470,046
ELECTRIC INCUBATOR
Filed July 11, 1946　　　　　　　　　　　　3 Sheets-Sheet 2
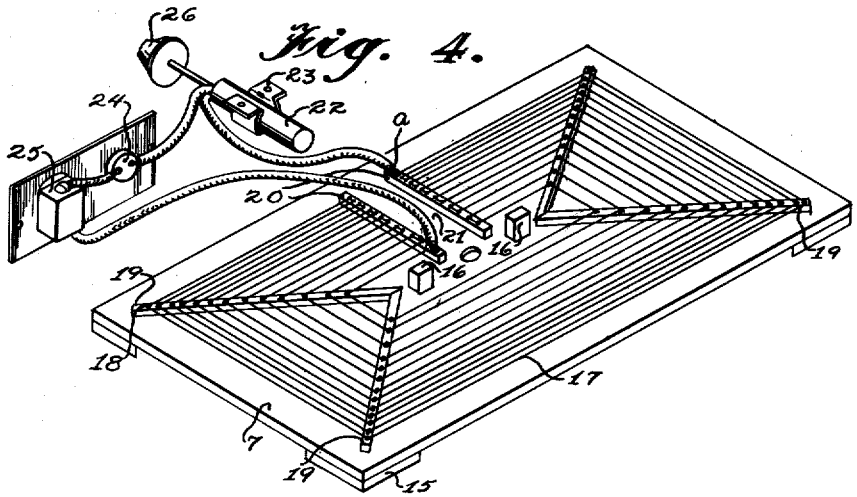
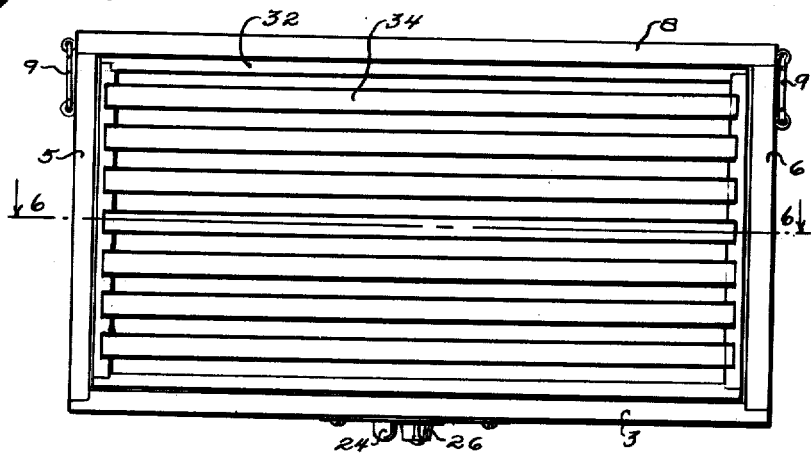
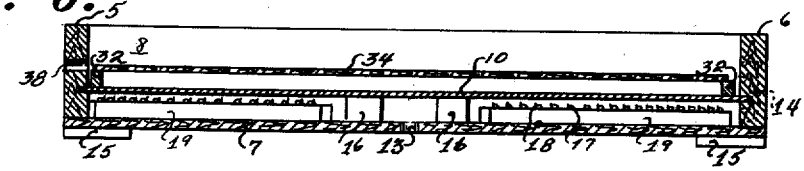
Inventor
James W. Napier
By Mason, Fenwick & Lawrence
Attorneys

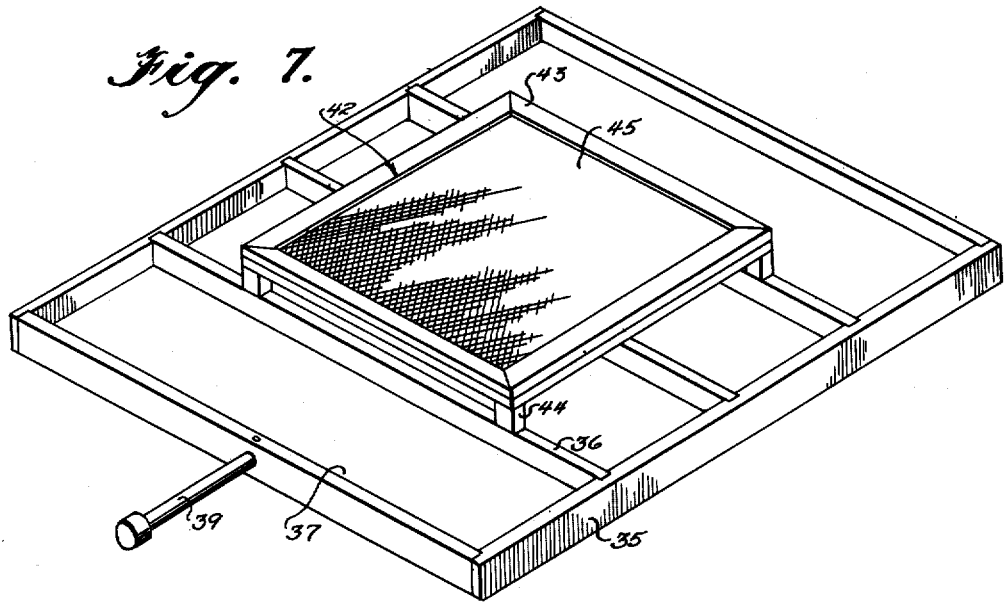
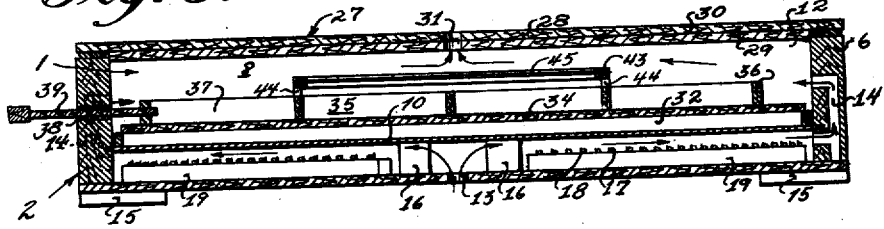

Patented May 10, 1949

2,470,046

UNITED STATES PATENT OFFICE 2,470,046

ELECTRIC INCUBATOR

James W. Napier, Macon, Ga.; Margaret H. Napier executrix of said James W. Napier, deceased Application July 11, 1946, Serial No. 682,767

3 Claims. (Cl. 119—37)

This invention relates to electric incubators.

It has for its general object the provision of an incubator of the class described, which also is adapted to serve as a brooder for the new chicks, in which the heating element is laid in a flat pattern uniformly distributed beneath the floor over the entire floor area, and of such resistance characteristics as never to get hot enough to emit light, the floor itself being a flat and preferably polished metal sheet. This arrangement has the advantage of the avoidance of any localized focus of heat so that the incubating chamber heats up uniformly from the center to the corners in substantially equal times. It is also free from the phenomenon of "hunting" which characterizes ordinary electric incubators in which the heating element becomes incandescent, by which, although the thermostat cuts off the current when the incubating chamber has reached the proper temperature, the heating element is still so hot as to raise the temperature of the incubating chamber a number of degrees hotter than the temperature at which the thermostat cuts off. In its use as a brooder it keeps the chicks from crowding and the temperature of the floor is such that the droppings are not cooked and made adhesive, but dry into flakes that may be readily swept out as a powder.

Another object of the invention is the provision of novel ventilating means, and egg-supporting, egg turning, and humidifying means which can be readily removed in order to use the apparatus as a brooder.

Other objects of the invention will appear as the following description of a preferred and practical embodiment thereof proceeds.

In the drawings which accompany and form a part of the following specification, and throughout the several figures of which the same reference characters have been employed to denote identical parts:

Figure 1 is a perspective view of the incubator cabinet stripped down to the floor;

Figure 2 is a cross-section taken along the line 2—2 of Figure 1, the cover being shown;

Figure 3 is a cross-section taken along the line 3—3 of Figure 2, the cover being omitted;

Figure 4 is a perspective view of the bottom of the cabinet with the heating element mounted thereon showing the controlling and indicating device;

Figure 5 is a plan view of the cabinet, showing the egg rack in place;

Figure 6 is a cross-section taken along the line 6—6 of Figure 5;

Figure 7 is a perspective view of the egg turner and humidifier;

Figure 8 is a cross-section taken along the line 8—8 of Figure 7;

Figure 9 is a fragmentary plan view of an alternative egg rack.

Referring now in detail to the construction, the numeral 1 of Figure 2 represents the brooder as a whole, comprising the cabinet 2, perhaps best shown in Figure 1, having vertical sides consisting of a front wall 3, back wall 4, and end walls 5 and 6, secured to the bottom 7. The back wall is divided longitudinally to provide a removable upper section 8, which is attached by hooks 9. By removing this section, access may be had to the eggs without removing the cover of the cabinet.

The vertical sides are provided with grooves 11 in a common longitudinal plane above the bottom, in which grooves are seated the peripheral edges of a metallic floor plate 10, of metal having good heat conductivity such as aluminum or copper. This floor plate divides the cabinet into a lower heater chamber 11 and an upper incubating chamber 12.

The bottom has a central hole 13, and the front and end walls have air passages 14, each placing the heater chamber in communication with the incubating chamber, and the cabinet rests upon feet 15, secured to the bottom, providing an airway beneath the bottom accessible to the central hole 13. A pair of blocks 16 near the middle of the heating chamber support the floor plate 10, keeping it from sagging.

The heating element is shown in Figure 4. It consists of a resistance wire 17, wound about pins 18, carried by wooden battens 19 and 20, secured to the upper face of the bottom 7. The battens 19 are arranged in V-formation, convergent inwardly from the corners of the bottom. The battens 20 are at right angles to the front of the cabinet and spaced apart to form a channel 21 which receives the thermostat 22, as shown in Figure 3. The thermostat is clipped to the floor plate 10 by the clip 23, in metallic contact with the under side of the floor plate. The resistance wire 17 is preferably wound, as indicated in Figure 4, beginning at the point $a$, running clockwise about the outer sides of the pins to the point $b$, then reversing about the next inner series of pins, and so on, ending at the point $c$. The thermostatic switch 22 is in series circuit with a connector 25 and pilot light 24, and is adjustable so that the working temperature of the incubator can be precisely regulated by turning the adjusting knob 28.

The resistance wire 17 is wound in a flat pattern equidistant from the floor plate 10 at all points, the windings being so spaced as to distribute the heat substantially uniformly over the entire floor area. To obtain this result the sides adjacent the outlying regions of the heater chamber may be spaced more closely than those adjacent the middle. The wire 17 is of such resistance characteristics that it does not glow when heated. In fact, its temperature is not greatly in excess of the controlled temperature of the incubating chamber. This prevents continued rise of the temperature in the incubating chamber after the heating element has been cut off by the thermostat, due to excess heat stored in the heating element. One of the prominent features of the invention is the location of the thermostat in a chamber extraneous to the incubating chamber, yet responsive to the temperature of the incubating chamber through the common metal floor plate 10 that divides said chambers. This affords maximum protection to the thermostat.

Figure 2 shows the incubator with the cover closing the cabinet 2. The cover is preferably composed of two layers 28 and 29 of board or suitable material, the layer 28 resting upon the top of the vertical sides of the cabinet 2, while the layer 29 fits within the cabinet. These two layers are secured together, the interface between them being covered with a film 30 of aluminum paint to enhance the thermal insulation of the incubating chamber. The cover has a central hole 31, which is the outlet of the ventilation system. The heater element sets up a convection current. Air enters the heater chamber 11, through the bottom hole 13, becomes warmed, and passes through the passages 14, of which there are several on three sides, into the incubating chamber at the periphery thereof, and out through the hole 31 in the center. The hole 31 also serves as a inlet for the introduction of humidifying water, as will appear. An egg rack rests freely upon the floor plate 10. It consists of a supporting frame 32, best shown in Figure 5, the upper face of which carries a series of parallel spaced slats 34, extending longitudinally of the incubating chamber. An alternative construction of egg rack is shown in Figure 9, in which a frame 40 supports a sheet 41 of hardware cloth.

On top of the egg rack and cooperating therewith is the egg turner, shown in Figure 7. It comprises a rectangular frame 35, about as wide as the incubating chamber, but somewhat shorter so that it can be reciprocated lengthwise within the incubating chamber. It has cross partitions 36, extending widthwise at intervals, which define bottomless egg troughs 37. The side of the cabinet 2 has a hole 38, through which a handle 39 freely extends, said handle being attached to the corresponding side of the egg turner. By means of the handle the egg turner may be reciprocated upon the egg rack in a longitudinal direction with respect to the slats 34, turning the eggs which are in the egg trough 37 resting upon said slats.

The egg turner carries a humidifier 42, of such size that it is always under the hole 31 in the cover, regardless of the position of the egg turner. It comprises a frame 43, supported in elevated position with respect to the egg turner by the blocks 44, which rest upon certain of the cross partitions 36. A sheet of textile fabric 45, preferably of water absorptive nature, is suspended across the frame 43 in somewhat slack state, so as to become saturated with a quantity of water. The water is introduced through the hole 31. It wets both sides of the fabric, presenting an extended wet surface from which water is evaporated into the warm atmosphere of the incubating chamber supplying the required humidity.

When the hatch is completed, the egg rack, egg turner and humidifier are removed and the chicks placed directly upon the metal floor plate. The removable upper section 8 of the back wall 4, which terminates just above the level of the floor plate gives access to the incubating or brooding chamber for servicing. A dish 46 is shown in Figure 1, which is placed upon the floor plate 10, when the apparatus is employed as a brooder, to contain water for humidifying purposes.

While I have in the above description disclosed what I believe to be a preferred and practical embodiment of the invention, it will be understood by those skilled in the art that the details of construction and the arrangement of parts, as shown, are by way of example and not to be construed as limiting the scope of the invention.

What I claim as my invention is:

1. Electric incubator comprising a rectangular cabinet having surrounding front, back, and end walls, and a horizontal bottom and removable top, a flat sheet metal imperforate partition above said bottom and parallel thereto having its edges engaging said surrounding walls and being supported thereby, dividing said cabinet into lower and upper chambers, a system of battens secured to said bottom including opposite pairs convergent inwardly from the corners of said bottom, terminating in apices spaced apart in the longitudinal medial line of said bottom, and a pair of spaced parallel battens extending from the front of said cabinet toward said medial line between said apices forming a space to receive a thermostat, series of correspondingly spaced upright pins on said battens, and a heating element comprising a resistance wire wound serially about corresponding pins of each series, reversed in direction at each of said parallel battens whereby the space between them is free from wiring, a thermostat operatively connected with said heating element carried by the front wall of said cabinet extending into said space and having manual control means at the exterior of said front wall, a horizontal egg rack fitting said cabinet supported by the edge margins of said partition including a floor of spaced slats out of contact with said partition, and a rectangular reciprocable egg turning frame slidable upon said slat floor, being shorter than the interior or said cabinet in the direction of its reciprocation and having an operating handle extending freely through a hole in an end wall of said cabinet, said bottom and top having central ventilating holes, and at least one of said surrounding walls having bi-passages placing said lower and upper chambers into communication.

2. Electric incubator as claimed in claim 1, said back wall having a removable section above the level of said sheet metal partition.

3. Electric incubator as claimed in claim 1, said egg turning frame having transverse partitions defining egg troughs, and a humidifier supported by said frame and movable therewith, said humidifier including a sheet of absorptive cloth disposed substantially horizontal beneath the central hole in the top.

JAMES W. NAPIER.

REFERENCES CITED

The following references are of record in the file of this patent:

UNITED STATES PATENTS

| Number | Name | Date |
|---|---|---|
| 320,463 | Cutting | June 23, 1885 |
| 812,824 | Coburn | Feb. 20, 1906 |
| 840,498 | Keller | Jan. 8, 1907 |
| 916,454 | Koons | Mar. 30, 1909 |
| 1,029,537 | Ford | June 11, 1912 |
| 1,127,021 | Klett | Feb. 2, 1915 |
| 1,258,037 | Nelson | Mar. 5, 1918 |
| 1,330,721 | Riddle | Feb. 10, 1920 |
| 1,445,582 | Grant | Feb. 13, 1923 |
| 1,615,464 | Marsden | Jan. 25, 1927 |
| 1,617,920 | Miller | Feb. 15, 1927 |
| 1,808,306 | Johnson | June 2, 1931 |
| 1,841,723 | Folsom | Jan. 19, 1932 |
| 1,943,575 | Abendroth | Jan. 16, 1934 |
| 2,084,832 | Blaschke | June 22, 1937 |
| 2,193,370 | Kocher | Mar. 12, 1940 |
| 2,240,625 | FitzMaurice | May 6, 1941 |